United States Patent [19]
Krishnan et al.

[11] Patent Number: 5,417,749
[45] Date of Patent: May 23, 1995

[54] MICROEMULSION PRINTING INK

[75] Inventors: Ramasamy Krishnan, Colonia; John M. Rooney, Basking Ridge, both of N.J.; Robert W. Bassemir, Jamaica, N.Y.; Marilyn C. Yamat, Bogota, N.J.

[73] Assignee: Sun Chemical Corporation, Fort Lee, N.J.

[21] Appl. No.: 219,054

[22] Filed: Mar. 29, 1994

[51] Int. Cl.⁶ ............................................. C09D 11/02
[52] U.S. Cl. ................... 106/20 R; 106/28 R; 106/28 A; 106/29 R
[58] Field of Search ............... 106/20 R, 28 R, 28 A, 106/29 R

[56] References Cited

U.S. PATENT DOCUMENTS

| | | | |
|---|---|---|---|
| 2,357,927 | 9/1944 | Berg | 106/28 R |
| 4,337,161 | 6/1982 | Stayner | 252/49.5 |
| 4,981,517 | 1/1991 | DeSanto et al. | 106/28 |
| 5,047,084 | 9/1991 | Miller et al. | 106/27 R |
| 5,226,957 | 7/1993 | Wickramanayake et al. | 106/26 R |
| 5,342,440 | 8/1994 | Wickramanayake | 106/22 H |

FOREIGN PATENT DOCUMENTS

| | | | |
|---|---|---|---|
| 3239772 | 10/1991 | Japan | C09D 11/10 |
| 1449361 | 9/1976 | United Kingdom | C09D 11/02 |

*Primary Examiner*—Helene Klemanski
*Attorney, Agent, or Firm*—Jack Matalon

[57] ABSTRACT

A printing ink useful for "waterless" printing processes comprising a water-in-oil microemulsion wherein the water phase is present in an amount of about 5 to 20 wt. %, based on the weight of the ink. The water phase contains about 0.5 to 3 wt. %, based on the weight of the ink, of a surfactant which will not lower the surface tension (as measured at ambient temperature) of the ink, but will preferably increase the surface tension of the ink by at least about 5%. The ink optionally contains about 0.05 to 0.5 wt. %, based on the weight of the ink, of a water-soluble polymer capable of producing a viscosity in the water phase of about 5 to 10 poise as measured at ambient temperature.

10 Claims, No Drawings

MICROEMULSION PRINTING INK

The invention relates to a microemulsion printing ink particularly useful for waterless lithography. The use of the microemulsion printing ink of the present invention eliminates the need for chilling the rollers and waterless plates during waterless lithographic printing in order to control the rheology of the ink.

BACKGROUND OF THE INVENTION

There is considerable interest today in waterless lithography and both positive and negative printing plates are available from various sources such as Toray Industries of Japan. The image area of a waterless plate is a photopolymer similar to that used on conventional lithographic plates, but the non-image area is made from a siliconized rubber which is ink repellant.

Waterless lithography has a number of advantages and disadvantages. The principal advantage is the elimination of water, dampening fluids and fountain solutions from lithographic printing. Press start-up is achieved faster without water and dramatic savings of paper through reduced wastage offer considerable cost benefits. The waterless plate prints a slightly heavier film of ink than a conventional plate and this, coupled with the fact that the ink has not been diluted with fountain solutions leads to an increase in the density of color on the printed substrate. Moreover, the elimination of the fountain solution lowers the dot-gain of inks to the extent of 10–40%.

In addition, waterless lithographic printing permits reduced drying time and energy costs and may be carried out using relatively unskilled personnel whereas the difficulty in controlling the ink-water balance in conventional lithography necessitates the use of highly skilled pressmen who have the requisite expertise to properly match the printing ink and the fountain solution.

There are several disadvantages associated with waterless lithography such as susceptibility of the coating on the plate to scratching during handling. Hard surfaced substrates or those with high levels of lint and debris tend to damage the surface of the plate and therefore limit its life.

The most serious drawback of waterless lithography is that the absence of water during printing leads to the press running hotter. This increase in temperature has an adverse effect on the rheology of the ink which must be kept as high as possible to avoid problems of ink being picked up in the non-image areas—a problem known as "toning". The temperature of the plate cylinder at which background toning starts to appear is termed the Critical Toning Temperature (C.T.T.). The C.T.T. measurement is a good measurement of toning resistance, but is dependent on a number of factors such as press type, ink roller assembly, ink roller setting, printing speed, ink film thickness on the rollers, etc. In order to standardize the C.T.T. values, Toray Industries of Japan developed a testing device and procedure based on a "Davidson 700" press. The C.T.T. value measured by such device is termed the Critical Toning Index (C.T.I.) as a standard measure of toning resistance.

Waterless lithographic printing necessitates the use of inks with a high viscosity but with low tack. Typically an ink for use in waterless lithography will have a viscosity of 2 to 3 times that of a conventional ink in order to reduce the possibility of background toning. Ordinarily, high viscosity inks will have high tack; high tack will cause problems known as picking and piling. Therefore the waterless ink must be carefully formulated with appropriate resins so as to insure that the formulation will have a high viscosity and a low tack.

Since higher press operating temperatures result from the elimination of the fountain solution, multiple ink formulations or cooling of the vibrational rollers (and preferably also the plate) must be employed to avoid the background toning problem. If the presses are not chilled, three types of ink are required for use in waterless lithography: one for very cold temperatures in winter, one for average temperatures in the spring and fall and one for very warm temperatures in the summer. As would be expected, printers are reluctant to stock different inks during the year and must therefore retrofit their existing presses with thermostatic controls and large chillers, or purchase new presses having such controls and chillers or rely on conventional lithography.

Unless chilling of the rollers and plates is employed, the average temperature of the press during a medium-length press run will rise by 10° to 15° C. or more. Excessive press operating temperatures will result in background toning, increased dot gain and ink roller instability on light forms. On the other hand if, as a result of chilling, the press operates at too low a temperature, poor ink transfer to the substrate, mottling of solids and picking of the surface of the paper will result. Thus press operating temperatures must be carefully maintained in a narrow range between about 26° C. and 31° C.

The present invention allows printers to achieve the advantages of waterless lithography without the need for expensive equipment (and energy) to chill the rollers and plates. The fact that an ink in the form of a water-in-oil microemulsion utilized in conjunction with a waterless lithographic ink permits the press to run without chilling and without resulting in any significant background toning was totally unexpected, since it was always believed that the presence of any water would be detrimental to "waterless" lithography. Moreover, print quality comparable to that obtained by chilled, waterless lithographic printing processes is obtained with the ink of the present invention, notwithstanding that it was always thought that an ink containing emulsified fountain solution produces poorer print quality than the typical high viscosity waterless ink.

It should be noted that since the ink of the invention has a lower tack than the typical waterless ink, its usage results in reduced linting, picking and piling, thereby affording cleaner prints and increased plate life. Moreover, the C.T.I. of the present ink is not reduced even though the tack has been reduced well below the level associated with typical waterless inks.

DETAILS OF THE INVENTION

The printing ink of the invention comprises a water-in-oil microemulsion wherein the water phase is present in an amount of about 5 to 20 wt. %, preferably 8 to 15 wt. %, based on the weight of the ink. The water phase contains about 0.5 to 3 wt. %, preferably 1.0 to 2.0 wt. %, based on the weight of the ink, of a surfactant which will not lower the surface tension (as measured at ambient temperature) of the ink.

Optionally, the ink also contains about 0.05 to 0.5 wt. %, preferably 0.1 to 0.3 wt. %, based on the weight of the ink, of a water-soluble polymer capable of producing a viscosity in the water phase of about 5 to 10 poise (as measured at ambient temperature).

Since printing inks may be shipped in the winter in unheated railroad cars and/or trailers and inasmuch as the inks are stored in outside unheated tanks, it is desirable to include in the water phase a water soluble salt sufficient to lower the freezing point of the ink by at least about 20° C. The salt, if utilized, will be present in a concentration of about 0.01 to 0.1 molar. The most useful salts are those wherein the cationic moiety of the salt is a Group IIa element such as beryllium, magnesium, calcium, strontium, barium and the like and the anionic moiety is selected from the group consisting of sulfate, chloride and nitrate. A preferred salt is magnesium sulfate.

The surfactant included in the water phase is one which will not lower the surface tension (as measured at ambient temperature) of the ink. Preferably, the surfactant is one which will raise the surface tension (as measured at ambient temperature) of the ink by at least about 5%. Preferably, the surfactant is selected from the group consisting of lecithin and those alkylpolyglucosides containing 1.1 to 2 glucoside units and having 8 to 14 carbon atoms in the alkyl group.

As mentioned above, the water phase optionally contains a water-soluble polymer capable of producing a viscosity in the water phase of about 5 to 10 poise (as measured at ambient temperature). Suitable water-soluble polymers are the polyoxyalkylene glycols having 2 to 4 carbon atoms in the alkylene moiety. Preferably the polyoxyalkylene glycol comprises polyoxyethylene glycol.

The oil phase of the ink of the invention corresponds to the prior art waterless inks. Such prior art waterless inks will consist of a pigment portion (usually present in an amount of 25–50 wt. %) and a "varnish" portion. The varnish will typically contain high molecular weight modified phenolic resins. Modified hydrocarbon resins are sometimes present in order to improve gloss, flow and ink transfer. Usually a viscosity-increasing agent such as methyl hexahydrophthalic anhydride is added to increase the viscosity or molecular weight of the resin with a minimum loss of flow property. Other ingredients may also be present such as the following: bodying agents such as "Bentonite" or a polyamide such as "Versamide 125"; a silicone which may assist in reducing tack, while maintaining high viscosity; bodied linseed oil which is added to prevent the viscosity from being lowered during high temperatures and high shear rates; high molecular weight alkyds to improve gloss and ink flow.

A key component of the varnish portion is the solvent. The solvent will preferably have a boiling point of at least 280° C. and result in an ink formulation of high viscosity and low tack. The preferred solvents for such ink appear to be isoparaffins, alpha olefins or mixtures thereof.

The following examples shall serve to illustrate the benefits provided by the inks of the present invention.

EXAMPLE 1

A microemulsion ink was prepared by mixing 85 g of a water phase with 15 g of a "waterless" ink. The "waterless" ink consisted of the following ingredients:

| "Waterless" Ink Phase | |
|---|---|
| Ingredient | Amount, g |
| Rosin-modified phenolic resin | 45 |
| Polyurethane varnish | 5.0 |
| Wax | 2.0 |
| Phthalocyanine Blue pigment* | 40 |
| Butylated hydroxytoluene | 2.0 |
| Magie Oil 500 | 6.0 |

*40 wt. % pigment in phenolic resin varnish

The water phase was prepared from the following ingredients:

| Water Phase | |
|---|---|
| Ingredient | Amount, g |
| Water | 97 |
| Polyoxyethylene glycol | 1 |
| Lecithin | 1 |
| Magnesium sulfate | 1 |

The "waterless" ink and the microemulsion ink of the present invention were then employed in press trials for the printing of Canadian Pacific Newsprint. When the press was run with the "waterless" ink, chillers (set at −12° C.) were employed such that the ink train roll temperature was maintained in the range of about 40°–45° C. The print density on the paper was 1.11–1.26. However, it was observed that frequent web breaks, severe linting and toning occurred during the press trial.

The press trial was repeated using the microemulsion ink with the chillers turned off. During the press trial, the temperature of the ink train rollers remained in the range of 31°–33° C. without any supplemental cooling. The print density on the paper was 1.23–1.33 and the print run was smooth and clean, i.e. no appreciable linting or toning was observed and print quality was excellent.

EXAMPLE 2

A press trial was conducted on a "Komori 28" sheet-fed press using a Toray "waterless" yellow ink and a microemulsion ink prepared by adding 15 wt. % water and 1 wt. % alkyl polyglucoside ("Glucopan 465" from Henkel Corporation). The chiller on the press was turned off and the two inks were printed on sheets of 60 lb. coated stock.

It was observed that the Toray "waterless" ink exhibited signs of toning at 28° C., while the microemulsion ink of the present invention did not show signs of toning and the temperatures in the ink roller train and on the plate surface did not exceed 31° C. throughout the press run.

What is claimed is:

1. A printing ink comprising a water-in-oil microemulsion wherein the water phase is present in an amount of about 5 to 20 wt. %, based on the weight of the ink, said water phase containing about 0.5 to 3 wt. %, based on the weight of the ink, of a surfactant which will not lower the surface tension (as measured at ambient temperature) of the ink.

2. The ink of claim 1 wherein the water phase contains about 0.05 to 0.5 wt. %, based on the weight of the ink, of a water-soluble polymer capable of producing a viscosity in the water phase of about 5 to 10 poise (as measured at ambient temperature).

3. The ink of claim 1 wherein the water phase contains a water soluble salt sufficient to lower the freezing point of the ink by at least about 20° C.

4. The ink of claim 3 wherein the salt is present in a concentration of about 0.01 to 0.1 molar.

5. The ink of claim 4 wherein the cationic moiety of the salt is selected from the group consisting of beryllium, magnesium, calcium, strontium and barium and the anionic moiety is selected from the group consisting of sulfate, chloride and nitrate.

6. The ink of claim 5 wherein the salt comprises magnesium sulfate.

7. The ink of claim 1 wherein the water-soluble polymer comprises a polyoxyalkylene glycol having 2 to 4 carbon atoms in the alkylene moiety.

8. The ink of claim 7 wherein the polyoxyalkylene glycol comprises polyoxyethylene glycol.

9. The ink of claim 1 wherein the surfactant is one which will raise the surface tension (as measured at ambient temperature) of the ink by at least about 5%.

10. The ink of claim 8 wherein the surfactant is selected from the group consisting of lecithin and those alkylpolyglucosides containing 1.1 to 2 glucoside units and having 8 to 14 carbon atoms in the alkyl group.

* * * * *